US011890825B2

(12) United States Patent
Richardson

(10) Patent No.: US 11,890,825 B2
(45) Date of Patent: Feb. 6, 2024

(54) HYBRID MOLDED AND PULTRUDED DEVICES

(71) Applicant: Zephyros, Inc., Romeo, MI (US)

(72) Inventor: Henry E. Richardson, Romeo, MI (US)

(73) Assignee: Zephyros, Inc., Romeo, MI (US)

( * ) Notice: Subject to any disclaimer, the term of this patent is extended or adjusted under 35 U.S.C. 154(b) by 561 days.

(21) Appl. No.: 16/972,145

(22) PCT Filed: Jun. 13, 2019

(86) PCT No.: PCT/US2019/037111
§ 371 (c)(1),
(2) Date: Dec. 4, 2020

(87) PCT Pub. No.: WO2019/241598
PCT Pub. Date: Dec. 19, 2019

(65) Prior Publication Data
US 2021/0237377 A1    Aug. 5, 2021

Related U.S. Application Data

(60) Provisional application No. 62/815,155, filed on Mar. 7, 2019, provisional application No. 62/684,724, filed on Jun. 13, 2018.

(51) Int. Cl.
*B29C 44/00* (2006.01)
*B29C 44/04* (2006.01)
(Continued)

(52) U.S. Cl.
CPC .............. *B29C 70/52* (2013.01); *B29C 44/00* (2013.01); *B29C 44/04* (2013.01); *B29C 44/186* (2013.01);
(Continued)

(58) Field of Classification Search
CPC ......... B29C 44/00; B29C 44/04; B29C 44/18; B29C 44/186; B62D 29/002
(Continued)

(56) References Cited

U.S. PATENT DOCUMENTS 5,884,960 A    3/1999  Wycech
6,348,513 B1   2/2002  Hilborn et al.
(Continued)

FOREIGN PATENT DOCUMENTS

DE    102016207765 A1    11/2017
EP         3453597 A1     3/2019
(Continued)

OTHER PUBLICATIONS

India First Examination Report dated Aug. 2, 2022, Application No. 202037053859.
(Continued)

*Primary Examiner* — Dennis H Pedder
(74) *Attorney, Agent, or Firm* — The Dobrusin Law Firm, PC

(57) ABSTRACT

A structural member (10) comprising: (i) a pultruded secondary member (14) including a first surface and an opposing second surface; and (ii) a molded carrier (12) overmolded onto at least one of the first and second surface of the pultruded secondary member, the molded carrier including a plurality of ribs (16); wherein the secondary member and the carrier are dissimilar materials.

19 Claims, 5 Drawing Sheets

(51) Int. Cl.
*B62D 29/00* (2006.01)
*B29C 70/52* (2006.01)
*B29C 65/48* (2006.01)
*B29C 44/18* (2006.01)
B29C 70/72 (2006.01)
B29K 75/00 (2006.01)
B29L 31/30 (2006.01)

(52) U.S. Cl.
CPC ............ *B29C 65/48* (2013.01); *B62D 29/002* (2013.01); *B29C 70/72* (2013.01); *B29K 2075/00* (2013.01); *B29L 2031/3005* (2013.01); *B29L 2031/3055* (2013.01)

(58) Field of Classification Search
USPC .................................................... 296/187.02
See application file for complete search history.

(56) References Cited

U.S. PATENT DOCUMENTS

| | | | |
|---|---|---|---|
| 6,368,438 B1 | 4/2002 | Chang et al. | |
| 6,467,834 B1 | 10/2002 | Barz et al. | |
| 6,811,864 B2 | 11/2004 | Czaplicki et al. | |
| 6,890,021 B2 | 5/2005 | Bock et al. | |
| 6,920,693 B2 | 7/2005 | Hankins et al. | |
| 6,921,130 B2 | 7/2005 | Barz et al. | |
| 6,932,421 B2 | 8/2005 | Barz | |
| 7,105,112 B2 * | 9/2006 | Czaplicki ............. | B29C 44/348 264/53 |
| 7,125,461 B2 | 10/2006 | Czaplicki et al. | |
| 7,249,415 B2 | 7/2007 | Larsen et al. | |
| 8,133,929 B2 * | 3/2012 | Hoefflin ................. | C03C 25/36 521/134 |
| 8,361,589 B2 * | 1/2013 | Kraushaar ............ | B62D 29/002 428/317.1 |
| 10,174,778 B2 * | 1/2019 | Richardson .......... | B62D 27/026 |
| 10,570,258 B2 | 2/2020 | Richardson et al. | |
| 11,110,670 B2 | 9/2021 | Richardson et al. | |
| 2004/0076831 A1 | 4/2004 | Hable et al. | |
| 2015/0129116 A1 | 5/2015 | Richeton et al. | |
| 2018/0036970 A1 | 2/2018 | Chmielewski et al. | |
| 2020/0157293 A1 | 5/2020 | Chmielewski et al. | |
| 2021/0053625 A1 | 2/2021 | Richardson | |
| 2022/0080912 A1 | 3/2022 | Barz | |
| 2022/0097776 A1 | 3/2022 | Royston | |

FOREIGN PATENT DOCUMENTS

| | | |
|---|---|---|
| KR | 10-2005-0120688 | 12/2005 |
| WO | 2004/094175 A1 | 11/2004 |
| WO | 2013/182524 A1 | 12/2013 |
| WO | 2017/098155 A1 | 6/2017 |
| WO | 2020/198139 A1 | 10/2020 |
| WO | 2020/205192 A1 | 10/2020 |
| WO | 2020/214769 A1 | 10/2020 |
| WO | 2021/080917 A1 | 4/2021 |

OTHER PUBLICATIONS

International Search Report & Written Opinion dated Sep. 24, 2019, Application No. PCT/US2019/037111.
Korean Office Action dated Sep. 29, 2021, Application No. 10-2021-7000923.
Chinese First Office Action dated Jun. 27, 2022, Application No. 201980039728.6.
Korean Notice of Decision of Final Rejection dated Jun. 24, 2022, Applicaton No. 1020217000923.

* cited by examiner

HYBRID MOLDED AND PULTRUDED DEVICES

FIELD

The present invention generally relates to structural members, and more particularly to combination pultruded and molded structural members for use in providing reinforcement and support to sections of one or more structures.

BACKGROUND

Transportation vehicles frequently utilize structural members to form and/or support certain vehicle structures. Unfortunately, such members tend to be formed of relatively heavy materials, adding undesirable weight to the vehicle. For some applications, it has become popular in recent years to employ a polymeric carrier structure in combination with a secondary material, such as an expandable adhesive material as part of the reinforcement. However, even these materials may add significant weight and can be costly and time consuming to manufacture. Additionally, it may be difficult to provide sufficient structural support to certain vehicle structures using more lightweight materials, thereby increasing the risk of damage or breakage of the structural members, the vehicle structures being support by the structural members, or both.

Examples of structural members can be found in U.S. Pat. Nos. 6,932,421; 6,921,130; 6,920,693; 6,890,021; and 6,467,834, all of which are incorporated by reference herein for all purposes. Thus, there remains a need for structural reinforcements that include more lightweight materials while maintaining the necessary strength to support one or more vehicle structures or vehicle components. What is needed is a lightweight structural member that includes one or more strengthening features. There remains a need for structural members that may provide increased customization and tunability based on a desired application. What is needed is a structural member that may be configured to attach to a vehicle structure, one or more vehicle components, or both using a plurality of attachment features. There remains a need for a structural member that is cost-effective and easy to manufacture. What is needed is a structural member formed using a combination of time-efficient manufacturing techniques.

SUMMARY

The present teachings meet one or more of the above needs by the improved devices and methods described herein.

The present teachings meet one or more of the present needs by providing: a structural member comprising: (i) a pultruded secondary member including a first surface and an opposing second surface; and (ii) a molded carrier overmolded onto at least one of the first and second surface of the pultruded secondary member, the molded carrier including a plurality of ribs; wherein the secondary member and the carrier are dissimilar materials.

The structural member may include an adhesive material located onto at least one of the carrier and secondary member. The adhesive material may be an activatable adhesive material. The secondary member may include a tray surface formed in the first surface, the tray surface being shaped to receive a portion of the carrier. The second surface of the secondary member may be substantially free of any direct contact with the carrier. One or more of the carrier or secondary member may include one or more through-holes. The plurality of ribs may form one or more cavities. The carrier may be overmolded to at least partially encapsulate the secondary member. The plurality of ribs may form one or more cavities, and the one or more cavities may each include a cutout that exposes the secondary member. The cutouts of the one or more cavities may allow expansion of the secondary member beyond the carrier upon activation. The through holes may each include a reinforcement member. The structural member may include one or more projections extending from one or more walls of the carrier, one or more surfaces of the carrier, or both. The structural member may include one or more integrally formed fasteners. The one or more integrally formed fasteners may be a push pin type fastener.

The structural member may include an inner channel of the through holes which may be free of contact with the secondary member. The one or more through holes may be located on the one or more projections. The ribs may include one or more arcuate portions, one or more linear segments, or both. The through holes may extend through an entire thickness of the carrier. The secondary member may comprise an expandable material. The structural member may be configured to attach to a transmission of a vehicle, one or more body rails of a vehicle, or both. The carrier member may comprise a polyamide material. The secondary member comprises a polyurethane material. The carrier member may include an epoxy-based adhesive material. The secondary member may include one or more structures for receiving a material for forming the carrier member such that the structures assist in attaching the carrier member to the secondary member. The structural member may be located within a vehicle cavity. The structural member may be located within a vehicle cavity for reinforcing the vehicle cavity. The structural member may be located within a vehicle cavity for sealing the vehicle cavity. The material for forming the carrier member may be more ductile than a material for forming the secondary member. The material for forming the carrier member may be less ductile than a material for forming the secondary member.

The teachings provided herein are further directed to a method for forming a structural member comprising: pultruding a secondary member; locating the secondary member into a mold; overmolding a carrier material onto the secondary member; and optionally overmolding or extruding an adhesive material onto one or more of the secondary material and carrier material.

The method may include forming one or more openings in the secondary member during the pultruding step. The method may include forming one or more openings in the carrier during the overmolding step.

The present teachings meet one or more of the present needs by providing: structural reinforcements that include more lightweight materials while maintaining the necessary strength to support one or more vehicle structures or vehicle components; a lightweight structural member that includes one or more strengthening features; structural members that may provide increased customization and tunability based on a desired application; a structural member that may be configured to attach to a vehicle structure, one or more vehicle components, or both using a plurality of attachment features; a structural member that is cost-effective and easy to manufacture; a structural member formed using a combination of time-efficient manufacturing techniques; or a combination thereof.

DETAILED DESCRIPTION

Figure 1:
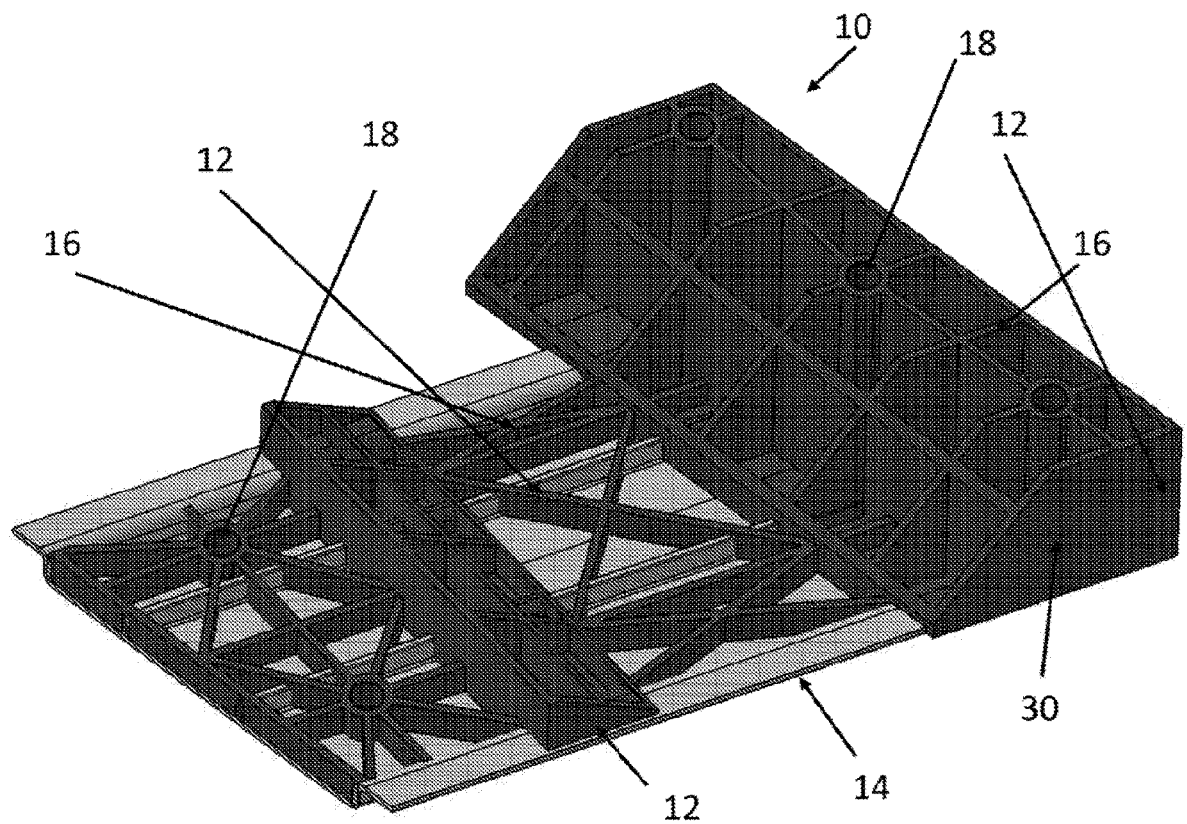
FIG. 1 is a perspective view of a structural member in accordance with the present teachings.

The explanations and illustrations presented herein are intended to acquaint others skilled in the art with the invention, its principles, and its practical application. The specific embodiments of the present invention as set forth are not intended as being exhaustive or limiting of the invention. The scope of the invention should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application is related to and claims the benefit of the filing dates of U.S. Provisional Application Ser. No. 62/684,724, filed Jun. 13, 2018, and 62/815,155, filed Mar. 7, 2019, the contents of both being hereby incorporated by reference herein for all purposes.

The teachings herein are directed toward a structural member. The structural member may function to provide structural integrity to a vehicle. The structural member may function to support one or more vehicle structures, vehicle components, or both. The structural member may function to connect one or more vehicle structures, vehicle components, or both. The structural member may be configured for integration into any vehicle, such as an automobile, truck, airplane, boat, train, or a combination thereof. The structural member may be configured for any industry requiring structural reinforcement, such as automotive, aeronautical, aerospace, residential and/or commercial real estate construction, transportation, or a combination thereof. For example, the structural member may be positioned in an automobile to support one or more structures and/or components of the vehicle, such as a steering column, transmission, engine block, instrument panel, console, or a combination thereof.

The structural member may include a carrier. The structural member may include a secondary member connected or secured to the carrier. The structural member may include one or more mounting features. The structural member may include one or more cavities, one or more through holes, one or more projections, one or more tabs, one or more reinforcement structures, one or more cavities, one or more cutouts, one or more walls, or a combination thereof. The structural member may be uniformly manufactured (i.e., integrally formed) or may include a plurality of components secured together. The structural member may be formed of substantially a single material or may be formed of a plurality of materials. For example, the carrier of the structural member may be a first material while the secondary member may be a second material.

The structural member may be manufactured using a variety of techniques. The structural member may be molded (e.g., injection molded), stamped, extruded, pultruded, cast, cut, or a combination thereof. The structural member may be manufactured using a single technique or a combination of techniques. For example, the carrier of the structural member may be molded while the secondary member may be pultruded or extruded. More specifically, the structural member may include a pultruded secondary member having a carrier overmolded around the secondary member, forming a hybrid structural member.

The structural member may include a carrier. The carrier may function to provide structural support to a vehicle structure, one or more vehicle components, or both. The carrier may function to support a secondary member. The carrier may be configured to attach to one or more components of a vehicle, a structure of a vehicle, or both. For example, the carrier may be secured to a transmission of the vehicle and also attach to one or more rails of the vehicle body. The carrier may include one or more faces, one or more surfaces, one or more walls, reinforcing structures, or a combination thereof. The carrier may include one or more arcuate portions, one or more linear portions, or both. The carrier may include one or more projections. The carrier may include one or more contoured surfaces, one or more flat surfaces, or both. The carrier may include one or more cutouts. The carrier may include one or more cavities, one or more through holes, or both. The carrier may include one or more fasteners. The carrier may include one or more arms, one or more fingers, one or more legs, or a combination thereof. The carrier may include one or more steps, one or more ledges, one or more flanges, one or more tabs, one or more gussets, one or more channels, or a combination thereof. The carrier may be any desired size and shape based on a desired application. For example, the carrier may structurally support a transmission of a vehicle, and the carrier may be substantially shaped to receive a portion of the transmission, substantially shaped to connect to the transmission, or both.

The carrier may be formed of a single integral piece. For example, the carrier may be a uniform injection-molded part. Alternatively, the carrier may comprise a plurality of subcomponents that form the carrier. For example, the carrier may include a first carrier component that is secured to a second carrier component via one or more adhesives, one or more fasteners, or a combination thereof.

The carrier may be structurally rigid. The carrier may be flexible. The carrier may have one or more localized flexible joints that allow flexing of the carrier only at desired locations. The carrier may be compressible. The carrier may be elastic so that, upon flexing, the carrier may return to an original position free of inelastic deformation. The carrier may be structurally rigid to support a desired load. For example, the carrier may support about 25 kilograms or more, about 50 kilograms or more, or about 75 kilograms or more. The carrier may support about 175 kilograms or less, about 150 kilograms or less, or about 125 kilograms or less.

The carrier may be formed of a moldable material. The carrier may be a polymeric material, a polyamide material, or both. The polymeric material may be a reinforced polymeric material. For example, the polymeric material may be a glass fiber reinforced polyamide. The polymeric material may be a thermoset material. The polymeric material may be a thermoplastic material. The polymeric material may be a thermoplastic epoxy material. The polymeric material may be a fiber reinforced thermoplastic epoxy material. The carrier may be any material that may provide structural reinforcement to a vehicle structure, one or more vehicle components, or both.

The carrier may include one or more abrasive surfaces. For example, the carrier may include one or more abrasions, one or more bumps, one or more ridges, or a combination thereof. The carrier may include one or more friction modifiers, such as grease, oil, silicone, other lubricant, or a combination thereof. The carrier may be free of one or more abrasive surfaces, one or more friction modifiers, or both.

The carrier may be formed from one or more walls. The walls may function to establish a shape of the carrier and support one or more components of a vehicle, a structure of the vehicle, or both. The walls may define an outer dimension of the carrier. The walls may interconnect to form a shape of the carrier. For example, peripheral edges of the walls may connect to one another to form a substantially outer perimeter of the carrier. The walls may be an exterior surface of the carrier. The walls may vary in size and shape. The walls may have a uniform thickness. The walls may have one or more arcuate portions, one or more linear segments, or both. The walls may be integrally formed (i.e., formed as a single piece free of secondary adhesives or fasteners that connect the walls). The walls may at least partially enclose one or more ribs of the carrier.

The carrier may include one or more ribs. The ribs may function to increase structural support of the carrier. The ribs may function to support one or more secondary members. The ribs may deflect, displace, or both, one or more secondary members upon expansion of the one or more secondary members, activation of the secondary members, or both. The ribs may be dispersed throughout the carrier to provide increased structural integrity in one or more desired locations. The ribs may be a gusset, flange, or both.

The ribs may be interconnected. The ribs may extend between one or more walls of the carrier. The ribs may vary in size and shape. The ribs may include one or more arcuate portions, one or more linear segments, or both. The ribs may be at least partially housed between walls of the carrier. The ribs may abut one or more surfaces of the carrier. The ribs may be interconnected at any desired position, angle, or both.

The ribs, the walls, or both may interconnect to form one or more cavities of the carrier. The cavities may function to house a secondary member. The cavities may extend through a thickness of the carrier. The cavities may extend through an entire thickness of the carrier, a partial thickness of the carrier, or both. The cavities may vary in size and shape and may be any size and shape that houses a secondary member. The cavities may be formed from about two or more, about three or more, or about four or more ribs, walls, or both. The cavities may be formed from about seven or less, about six or less, or about five or less ribs, walls, or both. A plurality of cavities may be located along the carrier, the secondary member, or both.

The one or more cavities may have a cutout located near one or more terminal ends. The cutout may function to expose the secondary member of the structural member. The cutout may function to direct expansion of the secondary member upon activation. The cutout may be a size and shape similar to the cavity. The cutout may have an opening greater or smaller than an opening of the cavity. The cutout may be located one or more exterior surfaces of the carrier. The cutout may be located anywhere along the carrier. The carrier may include a plurality of cutouts. The cutouts may be a uniform size and shape or may vary in size and shape.

The structural member may include one or more projections. The projection may function to abut one or more vehicle components, a vehicle structure, or both so that the structural member may be secured to the one or more vehicle components, a vehicle structure, or both. The projection may function to increase structural integrity of the structural member. The projection may project from any surface of the carrier, secondary member, or both. The projection may extend at an angle relative to one or more surfaces of the carrier, secondary member, or both. The projection may extend at an angle of about 30 degrees or more, about 45 degrees or more, or about 60 degrees or more. The projection may extend at an angle of about 120 degrees or less, about 105 degrees, or less or about 90 degrees or less. The projection may in the shape of a tab, post, extension, gusset, step, column, other projection, or a combination thereof.

The structural member may include a plurality of projections. The projections may vary in size and shape. The projections may be positioned anywhere along the carrier, the secondary member, or both. The projections may include one or more arcuate portions, one or more linear segments, or both. The projections may extend from a peripheral edge of the structural member. The projections may extend from one or more surfaces, one or more walls, or both of the structural member. The projections may be integrally formed with the carrier, the secondary member, or both.

The projections may be structurally rigid or may be flexible. For example, the projections may be flexible so that the projections deflect upon compression of the structural member and take a load upon compression.

One or more through holes may be located along the carrier. The through holes may function to receive one or more fasteners to secure the structural member to one or more vehicle components, a vehicle structure, or both. For example, one or more bolts may be threaded through the through holes so that the carrier may be fastened to a transmission of a vehicle. The through holes may extend between opposing surfaces of the carrier (i.e., extend through an entire thickness of the carrier). The through holes may extend through a thickness of the carrier less than an entire thickness. The through holes may be positioned anywhere along the carrier. The through holes may be located at an interconnection spot between a plurality of ribs, a plurality of walls, or a combination thereof. The through holes may be positioned along an exterior surface of the carrier. The through holes may bore a channel into and/or through the carrier. The through holes may bore a channel at an angle relative to a surface of the carrier. The channel may form an angle with a surface of the carrier of about 30 degrees or more, about 60 degrees or more, or about 90 degrees or more. The channel may form an angle with a surface of the carrier of about 175 degrees or less, about 120 degrees or less, or about 100 degrees or less.

The through holes may include a lubricant to aid with insertion of one or more fasteners. The lubricant may be grease, oil, silicon, another lubricant, or a combination thereof.

The through holes may be positioned within a vehicle to abut one or more associated holes of the vehicle. For example, a bolt may extend through a through hole of the carrier so that the bolt may be inserted into a hole of the vehicle, thereby securing the carrier to the vehicle.

The through holes may include a reinforcement member. The reinforcement member may function to increase structural integrity of the through holes. The reinforcement member be a different material than the carrier so that the reinforcement member may provide additional support for one or more components of a vehicle, a structure of a vehicle, or both. The reinforcement member may prevent compression of the carrier near the through holes. The reinforcement member may function in size and shape.

The reinforcement member may be a sleeve inserted into and extending through the through hole. The reinforcement member may be positioned near one or more openings of the through hole, or may reinforce substantially an entire through hole. Each through hole may have a reinforcement member. Only a portion of the through holes may have a reinforcement member. Alternatively, a through hole may have a plurality of reinforcement members. For example, a through hole may have a first reinforcement member near a first opening and a second reinforcement member near an opposing second opening.

The reinforcement member may be any material that provides additional structural integrity to the through holes. The reinforcement member may be a polymer, metal, or both. The metal may be steel, iron, copper, tin, aluminum, or a combination thereof. The reinforcement member may be stamped, cast, cut, or a combination thereof. The reinforcement member may include one or more corrosion prevention coatings, such as an electrophoretic paint, galvanic plating, or both.

The structural member may include one or more fasteners. The fasteners may function to secure the structural member to one or more components of a vehicle, a vehicle structure, or both. The fasteners may be integrally formed with the carrier, a secondary member, or both. The fasteners may be secured to the structural member. The fasteners may be a clip, bolt, screw, pin, lock, hook, the like, or a combination thereof. The fasteners may be positioned anywhere along the structural member. The fasteners may form a permanent connection to one or more portions of a vehicle or vehicle component. Permanent may be defined as a connection that may only be broken by inelastic deformation or damage to the structural member and/or fastener. The fasteners may removably engage the structural member to one or more portions of a vehicle or vehicle component.

The structural member may include a secondary member. The secondary member may function to provide structural integrity to the structural member, the vehicle structure, one or more vehicle components, or a combination thereof. The secondary member may function to secure, connect, or both the structural member to the vehicle structure, one or more vehicle components, or a combination thereof.

The secondary member may have a size and shape similar to the carrier. The secondary member may have a size and shape that differs from the carrier. The secondary member may have one or more surfaces, one or more walls, one or more cavities, one or more through holes, one or more reinforcement structures, one or more faces, or a combination thereof. The secondary member may have one or more contoured surfaces, one or more undulations, one or more curves, one or more arcuate portions, one or more linear portions, or a combination thereof. The secondary member may be substantially flat. For example, the secondary member may be formed into a sheet having a desired thickness. The thickness of the secondary member may be about 1 mm or more, about 2 mm or more, or about 3 mm or more. The thickness of the secondary member may be about 6 mm or less, about 5 mm or less, or about 4 mm or less. The thickness of the secondary member may be uniform throughout substantially the entire secondary member (e.g., a sheet). Alternatively, the thickness of the secondary member may vary throughout the secondary member. For example, a first portion of the secondary member may have a thickness greater than a second portion of the secondary member, or vice versa.

The secondary member may be manufactured using one or more techniques. For example, the secondary member may be pultruded. The pultrusion may be continuous or may be cut to desired dimensions. The secondary member may be formed of a polyurethane material. The secondary member may be formed of a thermoplastic material. The secondary member may be formed of a thermoplastic epoxy material. The structural member may be heat activated.

The secondary member may be secured and/or attached to the carrier. The secondary member may be disposed on one or more surfaces of the carrier. The secondary member may be inserted into one or more cavities of the carrier. The secondary member may be encapsulated by the carrier. For example, the carrier may be overmolded around the secondary member to at least partially encapsulate the secondary member. The carrier may include one or more cutouts that exposes the secondary member and allows protrusion of the secondary member outside of the carrier. The overmolded carrier may encapsulate one or more sides, one or more surfaces, or both of the secondary member. The carrier may form a cavity in which the secondary member is located. The carrier may abut one or more surfaces of the secondary member. An inner cavity of the carrier may substantially follow an exterior surface of the secondary member so that, once overmolded, the carrier substantially abuts an exterior of the secondary member.

The overmolding of the carrier around the secondary member may occur during manufacturing of the secondary member, after forming the secondary member, or both. For example, the secondary member may initially be pultruded, and the carrier may be overmolded around the pultruded secondary member.

The secondary member may be expandable. The secondary member may include an adhesive material and/or sealant material which may be a material that experiences expansion and/or cure upon exposures to temperatures of between about 148.89° C. to about 204.44° C. (about 300° F. to about 400° F.) (i.e., temperatures typically experienced in automotive painting or coating operations). The adhesive material and/or sealant material may be foamed (e.g., expanded) to a volume of at least about 5% greater, at least about 50% greater, at least about 200% greater, at least about 1000% greater, at least about 2000% greater, at least about 5000% greater, or higher relative to the original unexpanded volume.

The adhesive and/or sealant material may be an epoxy-based material such as those disclosed in U.S. Pat. Nos. 5,884,960; 6,348,513; 6,368,438; 6,811,864; 7,125,461; 7,249,415; and U.S. Patent Publication No. 2004/0076831, all of which are incorporated by reference herein for all purposes.

The adhesive materials and sealant materials may include an epoxy resin component. Epoxy resin is used herein to mean any of the conventional epoxy materials containing at least one epoxy functional group. The epoxy resins may be difunctional, trifunctional, multifunctional, combinations thereof or otherwise. Moreover, the term epoxy resin can be used to denote one epoxy resin or a combination of epoxy resins. The polymer-based materials may be epoxy-containing materials having one or more oxirane rings polymerizable by a ring opening reaction. The adhesive and/or sealant material may include between about 2% and 70% by weight epoxy resin, between about 7% and 50% by weight epoxy resin, between about 15% and 40% by weight epoxy resin, or between about 15% and about 25% by weight epoxy resin.

The epoxy may be aliphatic, cycloaliphatic, or aromatic. The epoxy may be supplied as a solid (e.g., as pellets, chunks, pieces or the like) or a liquid (e.g., an epoxy resin) or both. As used herein, a resin is considered to be a solid resin if it is solid at a temperature of 23° C. and is considered to be a liquid resin if it a liquid at 23° C. The presence of the epoxy resin increases the adhesion, flow properties, or both of the adhesive and/or sealant. One exemplary epoxy resin may be a phenolic resin, which may be a novalac type or other type resin. For example, bisphenol A resin, bisphenol F resin, a combination thereof or the like may be employed. Moreover, various mixtures of several different epoxy resins may be employed. Examples of suitable epoxy resins are sold under the tradename DER® (e.g., DER 331, DER 661, DER 662), commercially available from the Dow Chemical Company, Midland, Mich.

Liquid epoxy resins may be utilized. Such resins may be utilized to reduce the overall viscosity of the adhesive or sealant. Liquid epoxy resins that may be used typically may have a viscosity at a temperature of 23° C. of at least about 5000 cps, at least about 8000 cps, or at least about 11,000 cps, but may be less than about 30,000 cps, less than about 22,000 cps, or less than about 15,000 cps, although higher and lower values may also be possible unless otherwise stated. The liquid epoxy resin may have an epoxy equivalent weight of at least about g/eq, at least about 150 g/eq, or at least about 185 g/eq, but may be less than about 300 g/eq, less than about 220 g/eq, or less than about 195 g/eq, although higher and lower values may also be possible unless otherwise stated. The liquid epoxy resin may include diglycidyl ethers that may be aromatic phenol based (bisphenol A or F) and are sold under the tradename DER 331, commercially available from the Dow Chemical Company and EPON 828 and EPON 863, commercially available from Hexion Specialty Chemicals.

The epoxy resins used herein are such that the formulated adhesive and sealant may be dry to the touch at ambient temperature.

Several additional polymers may be incorporated into the adhesive and/or sealant material, e.g., by copolymerization, by blending, or otherwise. For example, without limitation, other polymers that might be appropriately incorporated into the sealant material include halogenated polymers, polycarbonates, polyketones, urethanes, polyesters, silanes, sulfones, allyls, olefins, styrenes, acetates, ethylene vinyl acetates, acrylates, methacrylates, epoxies, silicones, phenolics, rubbers, polyphenylene oxides, terphthalates, or mixtures thereof. Other potential polymeric materials may be or may include, without limitation, polyethylene, polypropylene, polystyrene, polyolefin, polyacrylate, poly(ethylene oxide), poly(ethyleneimine), polyester, polyurethane, polysiloxane, polyether, polyphosphazine, polyimide, polyimide, polyisobutylene, polyacrylonitrile, poly(vinyl chloride), poly(methylmethacrylate), poly(vinyl acetate), poly(vinylidene chloride), polytetrafluoroethylene, polyisoprene, polyacrylamide, polyacrylic acid, polymethacrylate, and polyacetals.

The adhesive and/or sealant material may also include one or more materials for controlling the rheological characteristics of the sealant material over a range of temperatures (e.g., up to about 250° C. or greater). Any suitable art-disclosed rheology modifier may be used, and thus the rheology modifier may be organic or inorganic, liquid or solid, or otherwise. The rheology modifier may be a polymer, and more preferably one based upon an olefinic (e.g., an ethylene, a butylenes, a propylene or the like), a styrenic (e.g., a styrene-butadiene-containing rubber), an acrylic or an unsaturated carboxylic acid or its ester (such as acrylates, methacrylates or mixtures thereof; e.g., ethylene methyl acrylate (EMA) polymer) or acetates (e.g., EVA). The rheology modifier may be provided in a generally homogeneous state or suitable compounded with other ingredients. It is also contemplated that the various clays, minerals or other materials discussed in relation to fillers below may be employed to modify rheology of the adhesive and/or sealant material.

The adhesive and/or sealant material may each include one or more curing agents that assist the adhesive and/or sealant material in curing by crosslinking of the polymers, epoxy resins, and other ingredients in the material. The amount of curing agents or curing agent accelerators present in the adhesive and/or sealant material may range from about 0.001% by weight to about 9% by weight, from about 0.2 to about 6 wt %, or from about 2 wt % to about 6% by weight. The curing agent materials may be selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolak resins, copolymers such as those of phenol terpene, polyvinyl phenol, or bisphenol-A formaldehyde copolymers, bishydroxyphenyl alkanes or the like), dihydrazides, sulfonamides, diamino diphenyl solfone, anhydrides, mercaptans, imidazoles, ureas, tertiary amines, BF3 complexes or mixtures thereof. The curing agents may include modified and unmodified polyamines or polyamides such as triethylenetetramine, diethylenetriamine tetraethylenepentamine, cyanoguanidine, dicyandiamides, and the like.

An accelerator for the curing agents (e.g., a modified or unmodified urea such as methylene diphenyl bis urea, an imidazole, blocked amine or a combination thereof) may also be provided for preparing the adhesive and/or sealant material.

The adhesive and/or sealant materials may contain other additives such as flexibilizers, impact modifiers, polymers or copolymers fillers and other elongation promoting additives.

Figure 2:
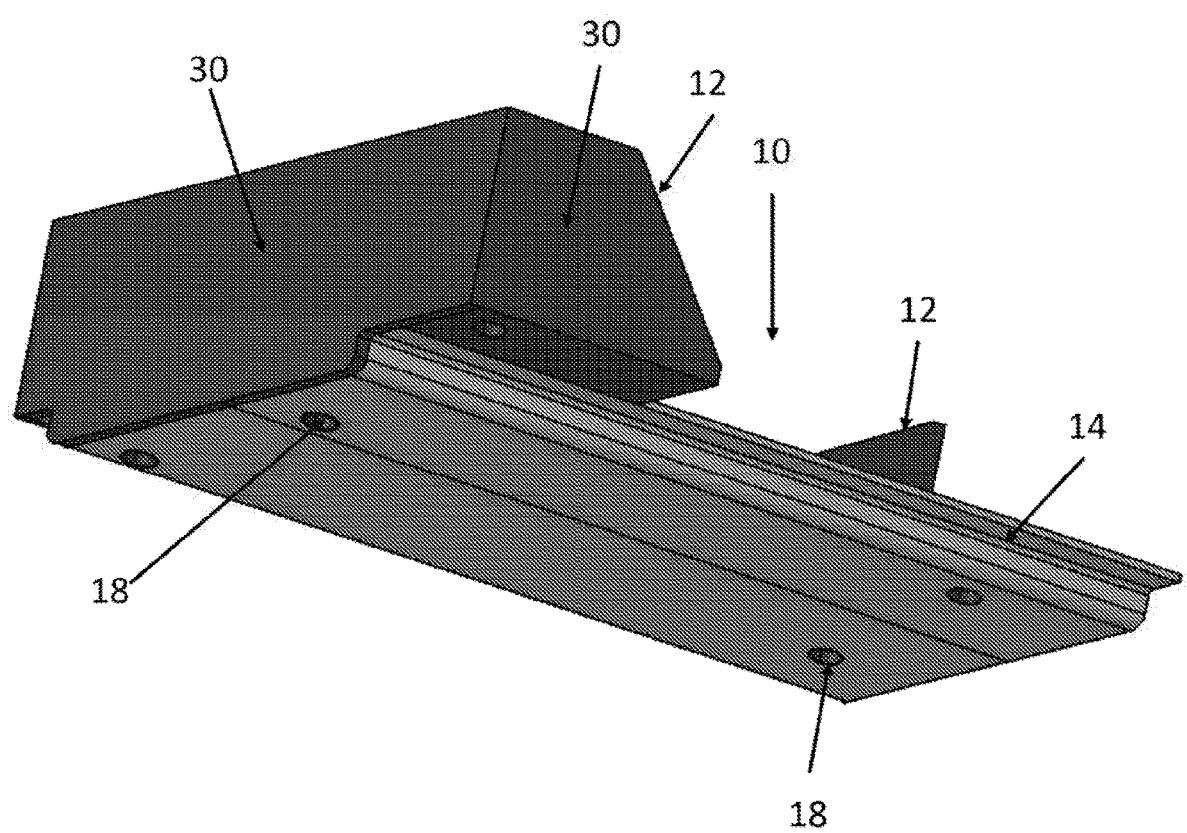
FIG. 2 is an additional perspective view of the structural member of FIG. 1.

Turning now to the figures, FIGS. 1 and 2 illustrate perspective views of a structural member 10. The structural member 10 includes a carrier 12 having one or more walls 30. The structural member 10 includes a secondary member 14. The carrier 12 includes a plurality of interconnected ribs 16. The carrier 12 and the secondary member 14 include one or more through holes 18.

Figure 3:
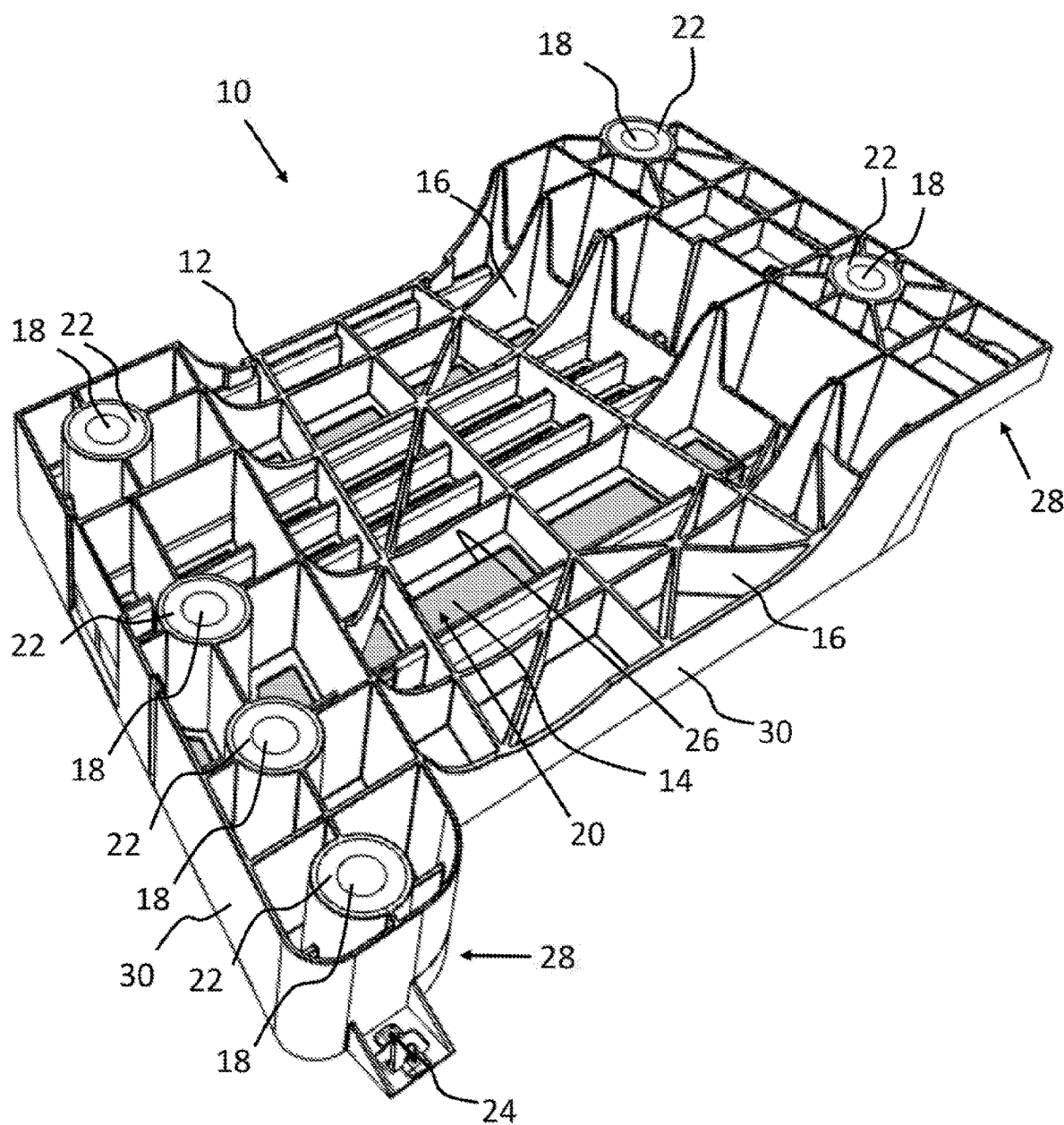
FIG. 3 is a perspective view of a structural member.
Figure 4:
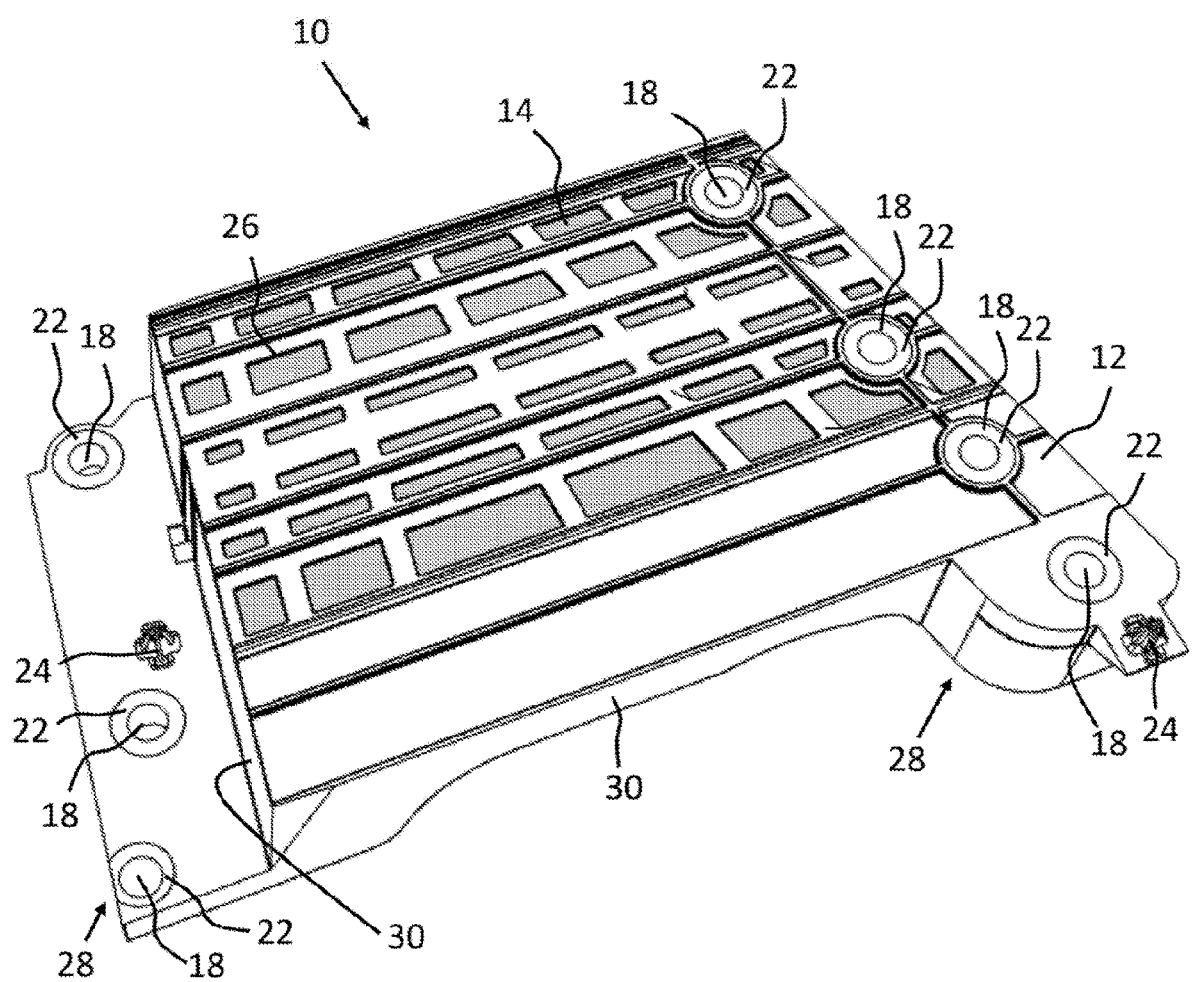
FIG. 4 is an additional perspective view of the structural member of FIG. 3.
Figure 5:
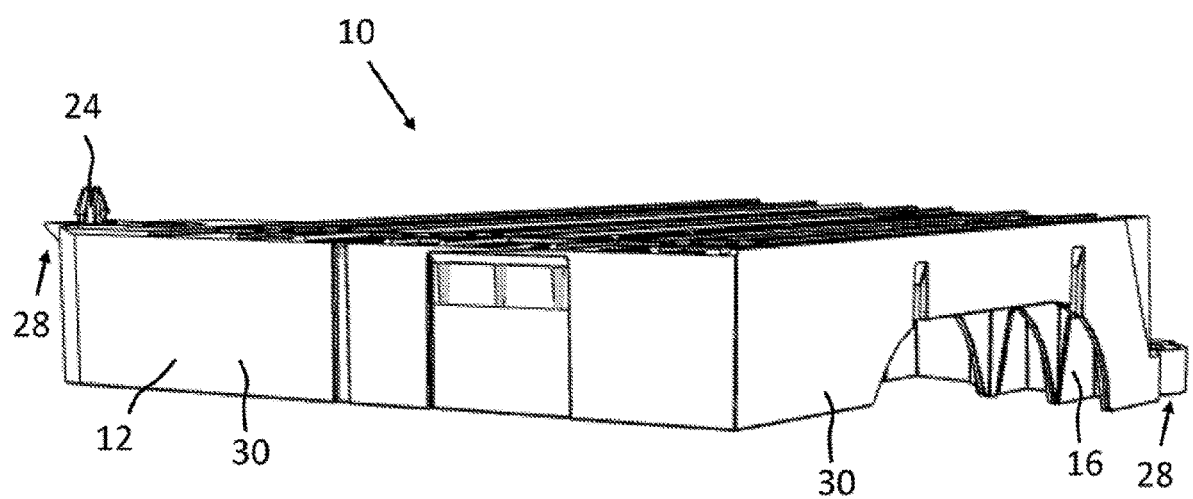
FIG. 5 is a perspective side view of the structural member of FIG. 3.

FIGS. 3-5 illustrate perspective views of a structural member 10. The structural member 10 includes a carrier 12. The carrier 12 is overmolded around a secondary member 14 so that the secondary member 14 is at least partially enclosed by the carrier 12. The carrier 12 includes a plurality of interconnected ribs 16 that support the secondary member 14 and increase structural integrity of the carrier 12. The ribs 16 are positioned within a plurality of walls 30 of the carrier 12. The walls 30, the ribs 16, or both form a plurality of cavities 20 having a cutout 26 that exposes the secondary member 14. The carrier 12 further includes a plurality of projections 28 extending from the carrier 12. The projections 28, the carrier 12, or both include a plurality of through holes 18 extending through the carrier 12 that are configured to receive one or more secondary fasteners, such as a bolt (not shown). Each through hole 18 is reinforced with a reinforcement member 22 positioned within a channel of the through hole 18. A plurality of fasteners 24, shown as push-pin type clips, are located along the carrier 12. It should be note that while push-pin type clips are illustrated, any fastener may be located along the structural member 10.

The structural member may be formed by a combination of molding steps and pultrusion steps. The molded polymeric member may be formed by an injection molding step. The pultruded member may be pultruded followed by the molded polymeric member being overmolded onto the pultruded member. Any adhesive material may be applied to the structural member by a second molding process (e.g., a two-shot molding process) whereby the adhesive material is injection molded onto the structural member.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of 100+/−15.

The preferred embodiment of the present invention has been disclosed. A person of ordinary skill in the art would realize however, that certain modifications would come within the teachings of this invention. Therefore, the following claims should be studied to determine the true scope and content of the invention.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

What is claimed is:

1. A structural member comprising:
   i) a pultruded secondary member including a first surface and an opposing second surface;
   ii) a molded carrier overmolded onto at least one of the first and second surface of the pultruded secondary member, the molded carrier including a plurality of ribs; and
   iii) an adhesive material located in contact with one or more of the secondary member or molded carrier;
   wherein the secondary member and the carrier are dissimilar materials, further wherein the second surface of the secondary member is substantially free of any direct contact with the carrier.

2. The structural member of claim 1, wherein the adhesive material is an activatable adhesive material.

3. The structural member of claim 1, wherein the secondary member includes a tray surface formed in the first surface, the tray surface being shaped to receive a portion of the carrier.

4. The structural member of claim 2, wherein one or more of the carrier or secondary member includes one or more through-holes.

5. The structural member of claim 1, wherein the plurality of ribs form one or more cavities.

6. The structural member of claim 1, wherein the carrier is overmolded to at least partially encapsulate the secondary member.

7. The structural member of claim 2, wherein the plurality of ribs form one or more cavities, and the one or more cavities each include a cutout that exposes the secondary member.

8. The structural member of claim 7, wherein the cutouts of the one or more cavities allows expansion of the secondary member beyond the carrier upon activation.

9. A structural member comprising:
   i) a pultruded secondary member including a first surface and an opposing second surface;
   ii) a molded carrier overmolded onto at least one of the first and second surface of the pultruded secondary member, the molded carrier including a plurality of ribs; and
   iii) an adhesive material located in contact with one or more of the secondary member or molded carrier;
   wherein the secondary member and the carrier are dissimilar, member and wherein the adhesive material is an activatable adhesive material, further wherein one or more of the carrier or secondary member includes one or more through-holes.

10. The structural member according to claim 1, wherein the structural member includes one or more projections extending from one or more walls of the carrier, one or more surfaces of the carrier, or both.

11. The structural member according to claim 2, further comprising one or more integrally formed fasteners.

12. A structural member comprising:
   i) a pultruded secondary member including a first surface and an opposing second surface;
   ii) a molded carrier overmolded onto at least one of the first and second surface of the pultruded secondary member, the molded carrier including a plurality of ribs; and
   iii) an adhesive material located in contact with one or more of the secondary member or molded carrier;
   wherein the secondary member and the carrier are dissimilar and wherein the adhesive material is an activatable adhesive material, further wherein one or more of the carrier or secondary member includes one or more through-holes, and wherein an inner channel of the through holes are free of contact with the secondary member.

13. A structural member comprising:
   i) a pultruded secondary member including a first surface and an opposing second surface;
   ii) a molded carrier overmolded onto at least one of the first and second surface of the pultruded secondary member, the molded carrier including a plurality of ribs; and
   iii) an adhesive material located in contact with one or more of the secondary member or molded carrier;
   wherein the secondary member and the carrier are dissimilar materials and wherein the structural member includes one or more projections extending from one or more walls of the carrier, one or more surfaces of the carrier, or both and further wherein the one or more through holes are located on the one or more projections.

14. The structural member according to claim 1, wherein the ribs include one or more arcuate portions, one or more linear segments, or both.

15. The structural member according to claim 12, wherein the through holes extend through an entire thickness of the carrier.

16. The structural member according to claim 1, wherein the structural member is configured to attach to a transmission of a vehicle, one or more body rails of a vehicle, or both.

17. The structural member according to claim 1, wherein the carrier member comprises a polyamide material.

18. The structural member according to claim 1, wherein the secondary member comprises a polyurethane material.

19. The structural member according to claim 18, wherein the adhesive material is an epoxy-based adhesive material.

* * * * *

UNITED STATES PATENT AND TRADEMARK OFFICE
CERTIFICATE OF CORRECTION

| | | |
|---|---|---|
| PATENT NO. | : 11,890,825 B2 | |
| APPLICATION NO. | : 16/972145 | |
| DATED | : February 6, 2024 | |
| INVENTOR(S) | : Henry E. Richardson | |

It is certified that error appears in the above-identified patent and that said Letters Patent is hereby corrected as shown below:

In the Claims

Column 12, Line 29, Claim 9 insert -- wherein the through holes each include a reinforcement -- after the word "holes"

Signed and Sealed this
Fifteenth Day of October, 2024

Katherine Kelly Vidal
*Director of the United States Patent and Trademark Office*